J. HOLLINGSWORTH.
Improvement in Grain-Drying Apparatus.
No. 131,682. Patented Sep. 24, 1872.
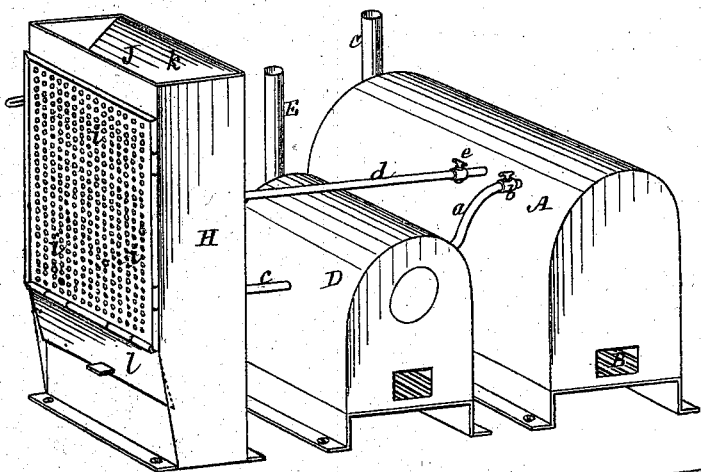
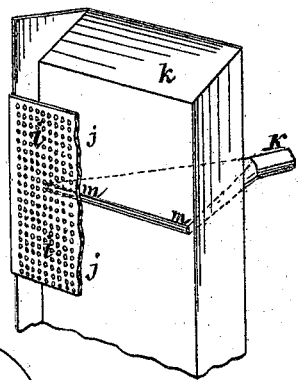
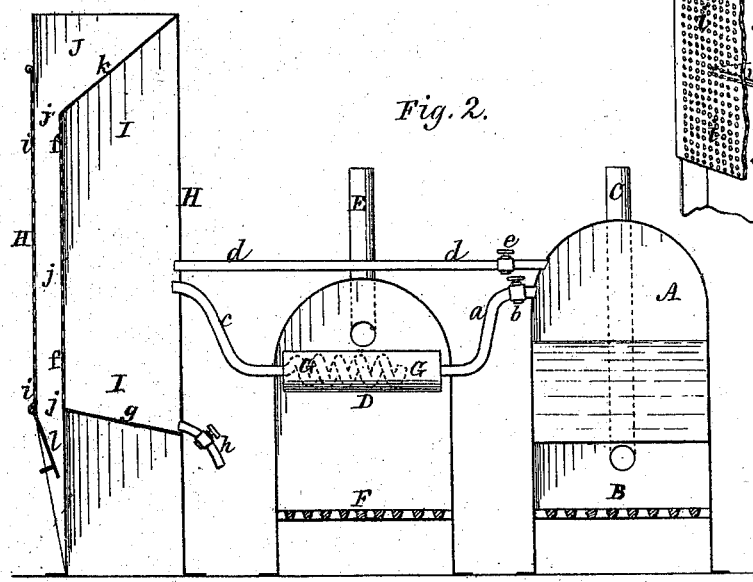

UNITED STATES PATENT OFFICE.

JEHU HOLLINGSWORTH, OF NEW YORK, N. Y.

IMPROVEMENT IN GRAIN-DRYING APPARATUS.

Specification forming part of Letters Patent No. 131,682, dated September 24, 1872.

*To all whom it may concern:*

Be it known that I, JEHU HOLLINGSWORTH, of the city, county, and State of New York, have invented certain new and useful Improvements in Grain-Drying Apparatus; and I do hereby declare the following to be a full, clear, and exact description of the same, reference being had to the accompanying drawing making a part of this specification, in which—

Figure 1 represents in perspective an external view of the apparatus; Fig. 2 represents a vertical longitudinal section through the apparatus; and Fig. 3 represents in perspective a modification of the steam-pipe or passage for conveying the steam to the grain directly.

Similar letters of reference where they occur in the separate figures denote like parts of the apparatus in the drawing.

My invention relates to an apparatus in which superheated steam, or superheated and saturated steam mixed, is escaped or injected through a column of falling grain, which latter is regulated as to quantity or rapidity of descent by an adjustable escape opening below the steaming point.

To enable others skilled in the art to make and use my invention I will proceed to describe the same with reference to the drawing.

A represents a steam-boiler of any ordinary well-known construction, arranged over a furnace, B, and furnished with a chimney or stack, C. D is a superheater, also arranged over a furnace, F, and furnished with a chimney or stack, E, for the escaping gases of combustion. In this superheater is arranged a chamber or coil, G, into which steam from the boiler A is conducted through a steam-pipe, $a$, furnished with a regulating cock or valve, $b$; and from the opposite end of the chamber or coil G the superheated steam is taken and carried by a pipe, $c$, to the grain-drying apparatus H. An independent steam-pipe, $d$, furnished with a regulating cock or valve, $e$, leads directly from the boiler A to the drying apparatus H, so that either superheated, or superheated mixed with saturated, steam may be used, as the condition of the grain may require, and so that the superheated and saturated steam may be mixed before or at the point where it comes in contact with the grain to be dried and treated. The grain-drying apparatus is constructed as follows: I is a chamber in which the steam pipe or pipes $c$ $d$ may terminate, and when they so terminate it becomes a steam-chamber, the wall $f$ of which is perforated to allow the steam to drive through. The bottom $g$ of the steam-chamber is inclined to drain off any water of condensation, and a cock, $h$, is arranged to draw said water from the chamber. At a short distance from the perforated wall $f$ of the chamber I, and parallel or nearly so with it, is another perforated wall, $i$, which on that side forms the exterior of the drying apparatus. The space $j$, between the perforated walls $f$ $i$, is quite narrow, and at the lower end of this narrow space or passage there is a regulating-door or slide, $l$, which can be opened or closed more or less, as circumstances may require, and as will be explained. Above or over the upper portion of the passage $j$ there is a hopper, J, into which the grain to be dried and treated is thrown, said grain falling upon the inclined top or cover $k$ of the chamber I, where it becomes somewhat warmed or heated and thus, to an extent, prevents the steam from condensing upon it.

In Fig. 3 I have shown a modification of my general plan of drying apparatus, in which the steam-pipe $k$, instead of terminating in the chamber I and allowing the steam to pass through the openings in the wall $f$, as shown in Fig. 2, extends through the chamber I, or immediately into the passage $j$, so that a thin sheet or volume of steam from the nozzle $m$ of the steam-pipe may strike the grain direct as it passes or drops through the space $j$, and instead of a single nozzle or sheet of steam so driving through the column of falling grain there may be two or more. In this case, as in that shown in Fig. 2, the outer perforated wall $i$ is used. When the nozzle $m$ is used it should be wide enough to allow the steam to jet through the whole width of the column of descending grain. Grain transported to market by vessels, and more particularly by sea, becomes damp, molded, and subjected to fungi, insects or their larvæ, and is not in sound condition for being stored or manufactured into meal or flour. By subjecting such, and indeed any other grain, to the direct action of dry steam it is not only dried, but thoroughly disinfected, and the flour or meal made there-from is much improved in quality, and will keep in almost any climate.

The operation of this steam-drying and grain-disinfecting apparatus is obvious; and it is only necessary to state that the quantity of grain passed through the steam, or the length of time that the grain is subjected to the direct action of the steam, is regulated by the opening or closing of the bottom of the grain-passage $j$ by the door or slide $l$. The steam, after it has passed through the grain and through the perforations in the wall $i$, may be conducted out of the building by any of the usual well-known ways.

For uniformity in drying grain the grain-passage $j$ is made so narrow that the steam may drive through freely and act on each individual grain alike clear through the falling column of grain. And to adapt the machine to the drying of corn as well as of rye or wheat, the space $j$ may be capable of enlargement for the former, as the grains are larger and afford more steam-space between them, and of contraction for the smaller grains by making either of the walls, but preferably the one, $f$, adjustable.

Having thus fully described my grain-drying and disinfecting apparatus, what I claim therein as new, and desire to secure by Letters Patent, is—

1. The herein-described process of drying grain by escaping a column of superheated steam through a mass of falling grain, as set forth.

2. I also claim the combination of a steam-boiler, superheater, and drying apparatus, and their connected and co-operative parts, substantially as herein described, for the purpose of drying and disinfecting grain, as set forth.

JEHU HOLLINGSWORTH.

Witnesses:
 W. W. HALL,
 WM. ONDERDONK.